US008847853B2

(12) United States Patent
Ohbitsu

(10) Patent No.: US 8,847,853 B2
(45) Date of Patent: Sep. 30, 2014

(54) STEREOSCOPIC IMAGE DISPLAY DEVICE

(75) Inventor: Toshiro Ohbitsu, Akishimashi (JP)

(73) Assignee: Fujitsu Limited, Kawasaki (JP)

( * ) Notice: Subject to any disclaimer, the term of this patent is extended or adjusted under 35 U.S.C. 154(b) by 55 days.

(21) Appl. No.: 13/458,576

(22) Filed: Apr. 27, 2012

(65) Prior Publication Data

US 2012/0313841 A1 Dec. 13, 2012

(30) Foreign Application Priority Data

Jun. 10, 2011 (JP) ................................ 2011-130070

(51) Int. Cl.
*G09G 3/00* (2006.01)
*G09G 3/30* (2006.01)
*G02F 1/1335* (2006.01)
*H04N 13/04* (2006.01)
*G02B 27/22* (2006.01)

(52) U.S. Cl.
CPC ...... *G02B 27/2214* (2013.01); *G02F 1/133526* (2013.01); *H04N 13/0404* (2013.01); *H04N 2213/001* (2013.01)
USPC .............................................. 345/32; 345/77

(58) Field of Classification Search
USPC .............................. 345/32, 46, 47, 419, 420
See application file for complete search history.

(56) References Cited

U.S. PATENT DOCUMENTS

| 2006/0050016 | A1 | 3/2006 | Tomisawa et al. | |
|---|---|---|---|---|
| 2006/0238545 | A1* | 10/2006 | Bakin et al. | 345/613 |
| 2008/0316380 | A1 | 12/2008 | Ijzerman et al. | |
| 2009/0096726 | A1* | 4/2009 | Uehara et al. | 345/84 |
| 2011/0050683 | A1 | 3/2011 | Young et al. | |
| 2013/0229449 | A1 | 9/2013 | Young et al. | |

FOREIGN PATENT DOCUMENTS

| CN | 101331420 | 12/2008 |
|---|---|---|
| CN | 102014289 | 4/2011 |
| JP | 57-210337 | 12/1982 |
| JP | 06-148763 | 5/1994 |
| JP | 10-174127 | 6/1998 |
| JP | 2003-131607 | 5/2003 |
| JP | 2004-144873 A | 5/2004 |
| JP | 2006-235332 | 9/2006 |
| JP | 2008-170841 | 7/2008 |
| JP | 2010-231010 | 10/2010 |

OTHER PUBLICATIONS

Korean Office Action mailed Jul. 19, 2013 for Korean Application No. 10-2012-0045151, with English-language Translation.

(Continued)

*Primary Examiner* — Michael Faragalla
(74) *Attorney, Agent, or Firm* — Fujitsu Patent Center

(57) ABSTRACT

A stereoscopic image display device comprising: a display device to include a display surface; a first optical unit to be installed in parallel to the display surface adjacently to the display surface of the display device, one surface including a first convex portion via which to form an image of light emerging from the display surface at a first image forming point and a first flat surface portion, and the other surface being a flat surface; and a second optical unit to be installed in parallel to the first optical unit adjacently to the first optical unit, one surface including a second convex portion via which to form the image of light emerging from the display surface at a second image forming point different from the first image forming point and a second flat surface portion, and the other surface being the flat surface.

3 Claims, 16 Drawing Sheets

(56) References Cited

OTHER PUBLICATIONS

CNOA—First Notification of Office Action dated Mar. 27, 2014 and the Search Report attached thereto with English translations issued in corresponding Chinese Patent Application No. 201210133098.9.

The Second Notification of Office Action dated Jul. 15, 2014 and the Search Report attached thereto with English translations issued in corresponding Chinese Patent Application No. 201210133098.9.

* cited by examiner

US 8,847,853 B2

STEREOSCOPIC IMAGE DISPLAY DEVICE

CROSS-REFERENCE TO RELATED APPLICATION

This application is based upon and claims the benefit of priority of the prior Japanese Patent Application No. 2011-130070 filed on Jun. 10, 2011, the entire contents of which are incorporated herein by reference.

FIELD

The present invention relates to a stereoscopic image display device.

BACKGROUND ART

There is a stereoscopic image generating device which generates images enabling a three dimensional vision (3D) by making use of parallax between the images captured by two cameras adjacent to each other. The stereoscopic image generating device generates and displays, in the images captured by, e.g., the two cameras adjacent to each other, the image captured by one camera as the image for the left eye and the image captured by the other camera as the image for the right eye.

The parallax is a difference between a position of the image for the left eye and a position of the image for the right eye with respect to the same object. In two objects existing within the image, one object appears to exist nearer or farther in a depthwise direction with respect to the other object due to the difference in parallax quantity. A parallax quantity is a magnitude of the parallax.

FIG. 1 is a diagram illustrating an example of a stereoscopic image. In FIG. 1, an image 910 is the image for the left eye, while an image 920 is the image for the right eye. Herein, an object A, an object B and an object C exist in each of the image 910 as the image for the left eye and the image 920 as the image for the right eye. Due to the parallaxes among these objects between the image 910 and the image 920, the object A, the object B and the object C appear to exist in this sequence from the nearest to a person who watches the stereoscopic image in FIG. 1.

The stereoscopic image generating device displays the image for the left eye to the left eye of a user and the image for the right eye to the right eye, thereby making the user feel a three-dimensional (stereoscopic) image. The stereoscopic image generating device displays the image for the left eye to the left eye and the image for the right eye to the right eye by use of, e.g., a liquid crystal display and dedicated eyeglasses worn by the user, thereby making the user perceive a stereoscopic vision.

[Patent document 1] Japanese Patent Application Laid-Open Publication No. 2006-235332
[Patent document 2] Japanese Patent Application Laid-Open Publication No. 2008-170841
[Patent document 3] Japanese Patent Application Laid-Open Publication No. H06-148763
[Patent document 4] Japanese Patent Application Laid-Open Publication No. H10-174127
[Patent document 5] Japanese Patent Application Laid-Open Publication No. 2003-131607

SUMMARY

Further, some of the stereoscopic image generating devices are configured to get different images visible to the left and right eyes respectively without using the dedicated eyeglasses by installing a lens sheet on the liquid crystal display. At this time, an optimal position (eye point) for the visual recognition is determined from a pixel size of the liquid crystal display, a shape of the lens sheet, a positional relationship between the liquid crystal display and the lens sheet, etc. At this time, the user, who visually recognizes the stereoscopic image, can visually recognize the stereoscopic image in only one position determined from a lens shape, a material, a position, etc of the lens sheet.

According to a first aspect, a stereoscopic image display device has: a display device to include a display surface; a first optical unit to be installed in parallel to the display surface adjacently to the display surface of the display device, one surface including a first convex portion via which to form an image of light emerging from the display surface at a first image forming point and a first flat surface portion, and the other surface being a flat surface; and a second optical unit to be installed in parallel to the first optical unit adjacently to the first optical unit, one surface including a second convex portion via which to form the image of light emerging from the display surface at a second image forming point different from the first image forming point and a second flat surface portion, and the other surface being the flat surface, wherein the light, emerging from the display surface, of which an image is formed at the first image forming point via the first convex portion, travels through the second flat surface portion, an image of the light, emerging from the display surface and travelling through the first flat surface portion and the second convex portion, is formed at the second image forming point, and the first image forming point and the second image forming point are set at different distances from the display surface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment will hereinafter be described with reference to the drawings. A configuration of the embodiment is an exemplification, and the configuration of the disclosure is not limited to the specific configuration of the embodiment of the disclosure. Implementation of the configuration of the disclosure may involve properly adopting a specific configuration corresponding to the embodiment.

Herein, the stereoscopic image displayed by the stereoscopic image generating device may also be a dynamic image (moving picture) and a static image.

Embodiment

Figure 1:
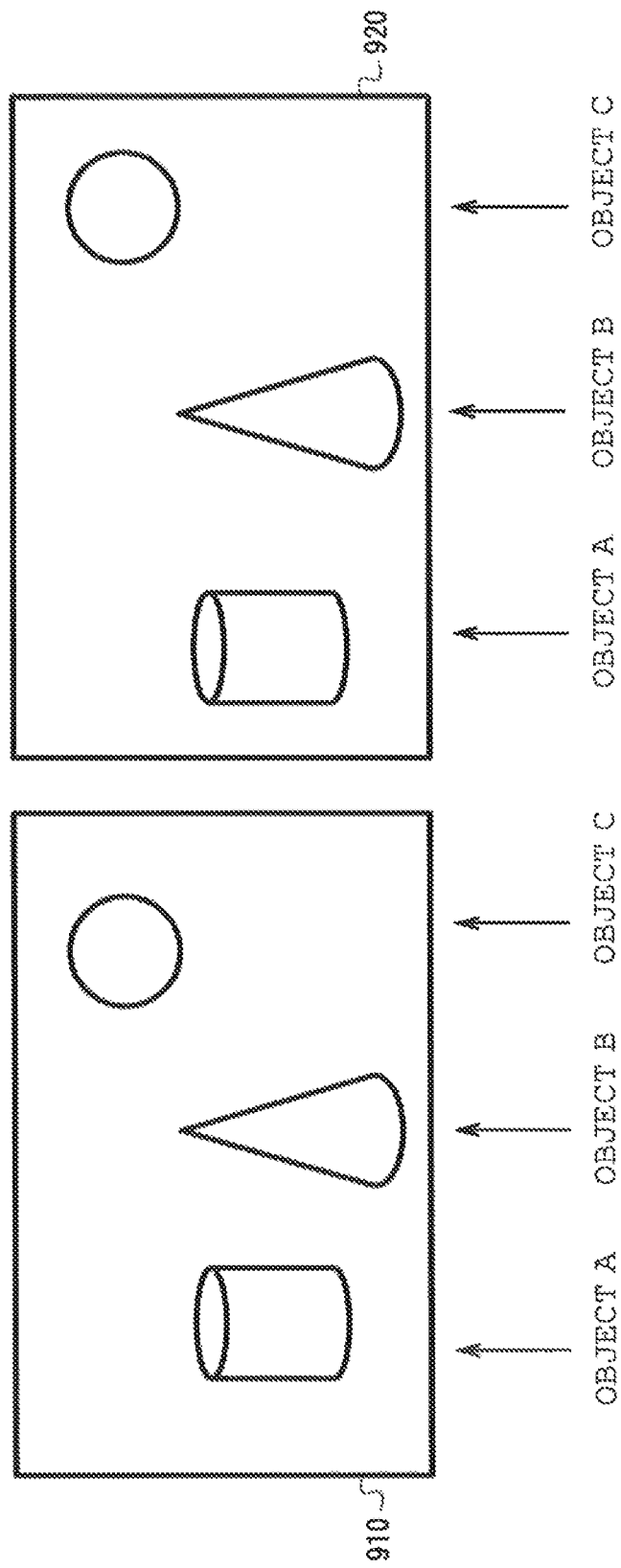
FIG. 1 is a diagram illustrating an example of a stereoscopic image.
Figure 2:
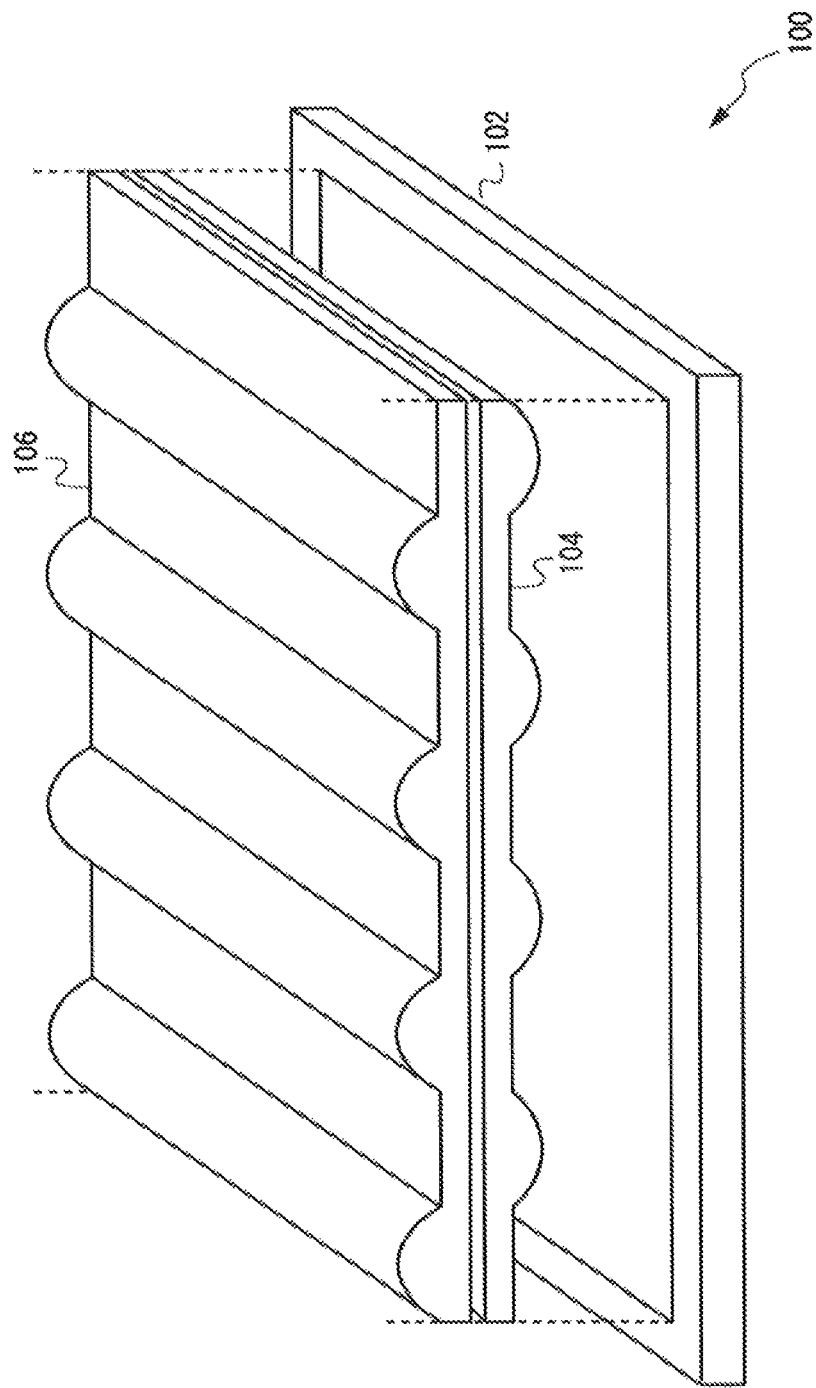
FIG. 2 is a view depicting an example of a configuration of a stereoscopic image display device in an embodiment.

FIG. 2 is a view illustrating an example of a configuration of the stereoscopic image generating device of the embodiment. A stereoscopic image generating device 100 includes a display device 102, a first optical unit 104 and a second optical unit 106. The stereoscopic image generating device 100 is configured by disposing, as in FIG. 2, the display device 102, the first optical unit 104 and the second optical unit 106 in this sequence. The display device 102, the first optical unit 104 and the second optical unit 106 are disposed substantially in parallel.

The display device 102 is, for example, a liquid crystal display. The display device 102 displays the image in response to an instruction inputted. The display device 102 displays the image on the surface on the side where the first optical unit 104 and the second optical unit 106 are disposed.

The first optical unit 104 includes a plurality of first lenses each taking a shape of lenticular lens and a flat surface portion on the surface on the side of the display device 102. An external surface (a surface opposite to the surface on the side of the display device 102) of the first optical unit 104 is flat. The external surface of the first optical unit 104 may be contiguous to the second optical unit 106. The first lens and the flat surface portion are installed so as to be parallel with a vertical direction of a pixel array (an array of display elements) of a screen of the display device.

The second optical unit 106 includes a plurality of second lenses each taking the shape of lenticular lens and a flat surface portion on the external surface (the surface opposite to the surface on the side of the display device 102). The surface, on the side of the display device 102, of the second optical unit 106, is flat. The surface, on the side of the display device 102, of the second optical unit 106 may be contiguous to the first optical unit 104. The second lens and the flat surface portion are installed so as to be parallel with the vertical direction of the pixel array (the array of display elements) of the screen of the display device.

Overall surfaces of the first optical unit 104 and the second optical unit 106 may be protected by transparent flat plates. Lenses used for the first optical unit 104 and the second optical unit 106 are curved lenses (plano-convex lenses) taking a series of Quonset shapes. The lenses used for the first optical unit 104 and the second optical unit 106 correspond to convex portions of the first optical unit 104 and the second optical unit 106. A shape of the curved lens taking the Quonset shape is a three-dimensional shape formed when scanning, in a direction of normal line of the plane, one of portions surrounded by a closed curve and a straight line in the case of cutting off, e.g., the closed curve (e.g., an ellipse) on the plane with the straight line on the plane. The shape of the curved lens taking the Quonset shape may also be a three-dimensional shape on one side, which is formed when cutting off, e.g., a cylinder (or an elliptic cylinder) with the plane parallel with a straight line in a heightwise direction of the cylinder (or the elliptic cylinder).

The first optical unit 104 and the second optical unit 106 may be integrated and separated as well.

Figure 3:
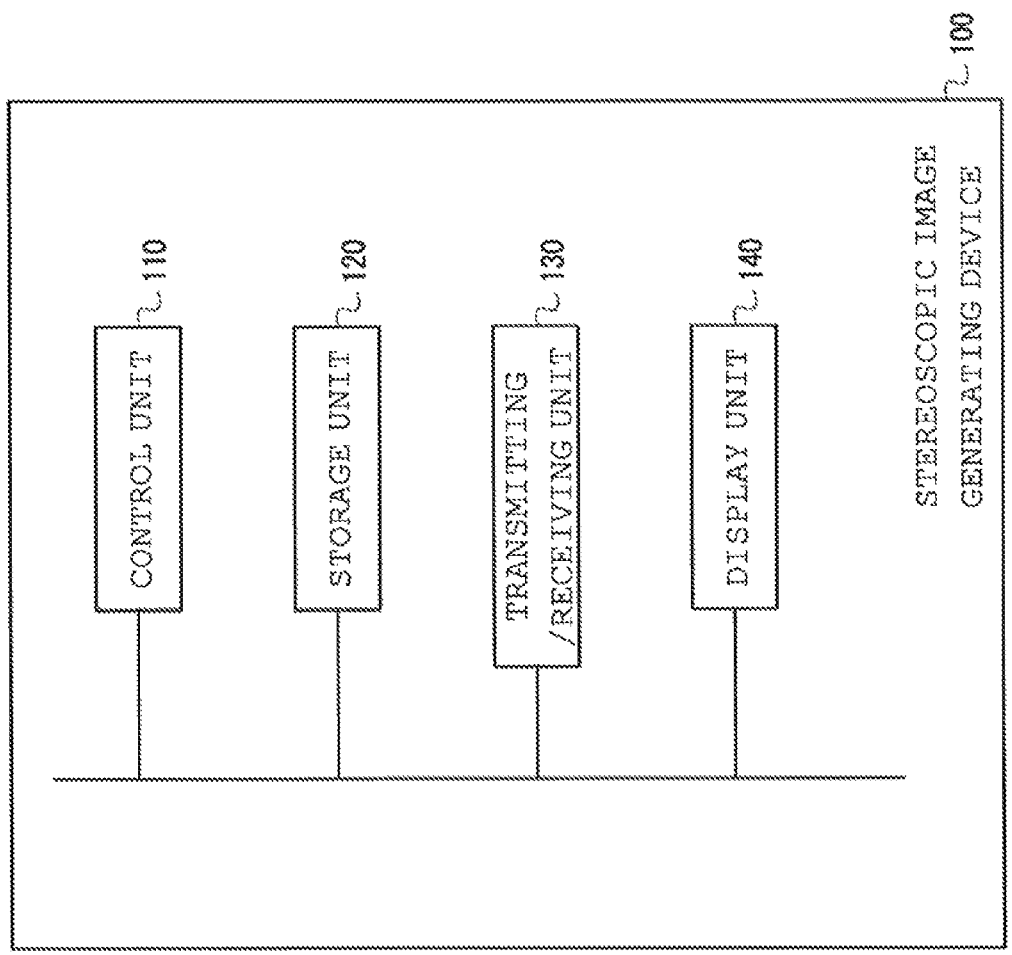
FIG. 3 is a diagram illustrating an example of function blocks of the stereoscopic image generating device.

FIG. 3 is a diagram illustrating an example of functional blocks of the stereoscopic image generating device. The stereoscopic image generating device 100 includes a control unit 110, a storage unit 120, a transmitting/receiving unit 130 and a display unit 140. The display unit 140, the control unit 110, the storage unit 120 and the transmitting/receiving unit 130 are connected via a bus.

The control unit 110 executes a program etc. stored in the storage unit 120 and instructs the display unit 140 to display a predetermined image.

The storage unit 120 gets stored with the program executed by the control unit 110 and various types of data utilized for the program. The storage unit 120 gets stored with the data of the stereoscopic image (e.g., the image data for the left eye and the image data for the right eye) displayed on the display device 102. The storage unit 120 may also be stored with information on various types of lens sheets.

The transmitting/receiving unit 130 performs communications with an external device via a network etc. in accordance with an instruction given from the control unit 110. The transmitting/receiving unit 130 can receive a signal detected by a switch etc.

The display unit 140 displays the predetermined image on the display device 102 according to the instruction given from the control unit 110.

The stereoscopic image generating device 100 can be realized by employing a general-purpose computer such as a personal computer (PC: Personal Computer), a dedicated or general-purpose computer such as a workstation (WS: Work Station) and a PDA (Personal Digital Assistant), or an electronic apparatus mounted with the computer. Further, the stereoscopic image generating device 100 can be realized by use of the dedicated or general-purpose computer such as a smartphone, a mobile phone and a car navigations system, or the electronic apparatus mounted with the computer. The computer is referred to also as an information processing device.

Figure 4:
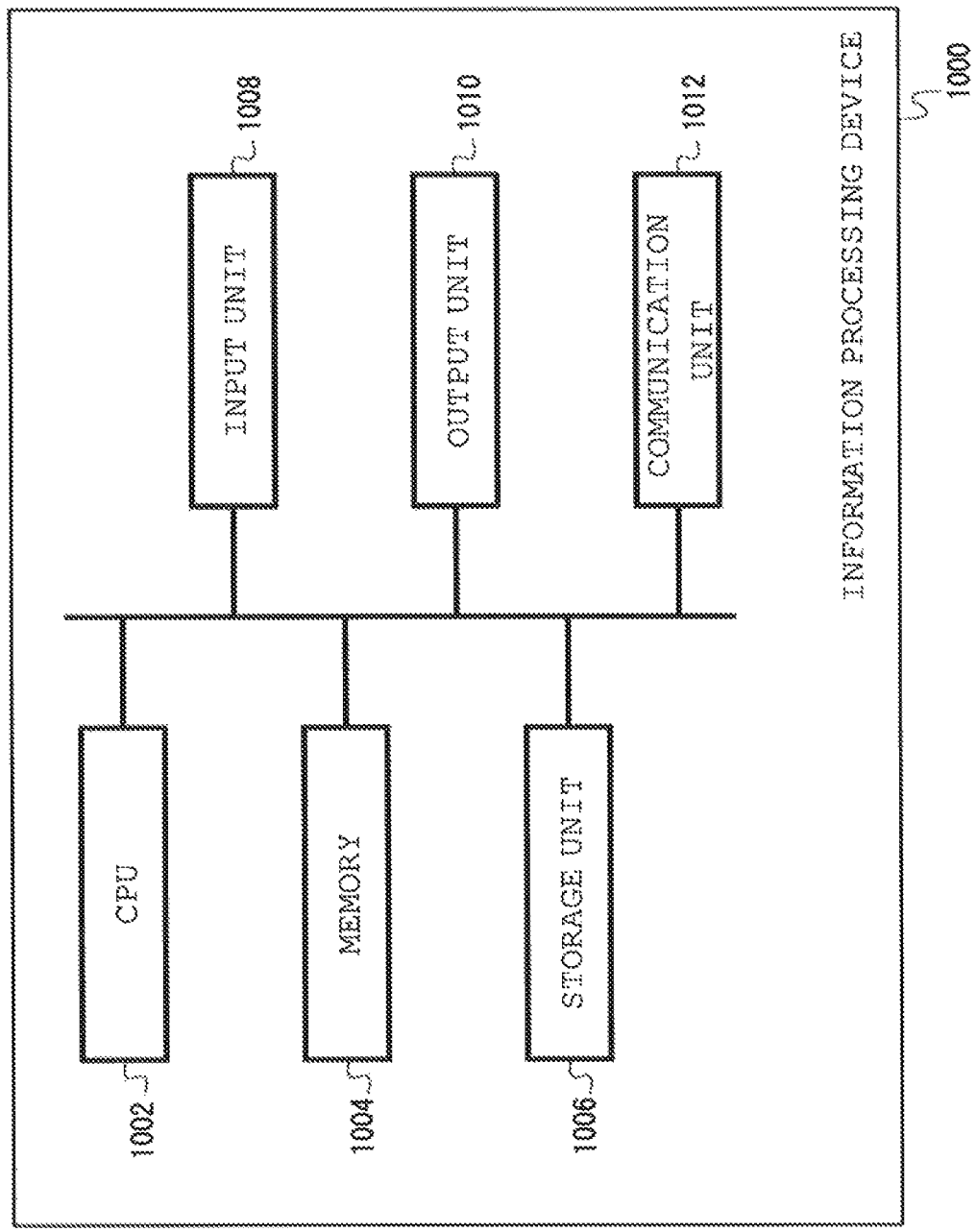
FIG. 4 is a diagram illustrating an example of a hardware configuration of an information processing device.

FIG. 4 is a diagram illustrating an example of a hardware configuration of the information processing device. The stereoscopic image generating device 100 is each realized by an information processing device 1000 as depicted in, e.g., FIG. 4.

The information processing device 1000 includes a CPU (Central Processing Unit) 1002, a memory 1004, a storage unit 1006, an input unit 1008, an output unit 1010 and a communication unit 1012.

In the information processing device 1000, the CPU 1002 loads the program stored in the recording unit 1006 into an operation area of the memory 1004 and executes the program, and peripheral devices are thus controlled through executing the program, thereby enabling actualization of the function which meets a predetermined purpose.

The CPU 1002 executes processes according to the program stored in the storage unit 1006.

The CPU 1002 caches the program and the data in the memory 1004 and deploys the operation area therein. The memory 1004 includes, e.g., a RAM (Random Access Memory) and a ROM (Read Only Memory). The memory 1004 is a main storage device.

The storage unit 1006 stores the various categories of programs and the various types of data in the recording medium in a readable/writable manner. The storage unit 1006 is exemplified such as an EPROM (Erasable Programmable ROM), a solid-state drive (SSD: Solid State Drive) and a hard disk drive (HDD: Hard Disk Drive). The storage unit 1006 is further exemplified such as a CD (Compact Disc) drive, a DVD (Digital Versatile Disk) drive, a +R/+RW drive, a HD DVD (High-Definition Digital Versatile Disk) drive, or a BD (Blu-ray Disk) drive. Further, the recording medium is exemplified such as a silicon disk including a nonvolatile semiconductor memory (flash memory), the hard disk, the CD, the DVD, the +R/+RW, the HD DVD or the BD. The CD is exemplified by a CD-R (Recordable), a CD-RW (Rewritable) and a CD-ROM. The DVD is exemplified by a DVD-R and a DVD-RAM (Random Access Memory). The BD is exemplified by a BD-R, a BD-RE (Rewritable) and a BD-ROM. Moreover, the storage unit 1006 can include a removable medium, i.e., a portable recording medium. The removable medium is exemplified by a USB (Universal Serial Bus) memory or by a disk recording medium such as the CD and the DVD. The storage unit 1006 is a secondary storage device.

The memory 1004 and the storage unit 1006 are computer-readable recording mediums.

The input unit 1008 accepts an operation instruction etc given from a user etc. The input unit 1008 is an input device such as a keyboard, a pointing device, a wireless remote controller, a microphone, a digital still camera and a digital video camera. The CPU 1002 is notified of the information inputted from the input unit 1008.

The output unit 1010 outputs the data processed by the CPU 1002 and the data stored in the memory 1004. The output unit 1010 is an output device such as a CRT (Cathode Ray Tube) display, an LCD (Liquid Crystal Display), a PDP (Plasma Display Panel), an EL (Electroluminescence) panel, a printer, a speaker, etc.

The communication unit 1012 transmits and receives the data to and from the external device. The communication unit 1012 is connected to the external devices via, e.g., a signal line. The external devices are, e.g., another information processing device, another storage device, etc. The communication unit 1012 is, e.g., a LAN (Local Area Network) interface board or a wireless communication circuit for wireless communications.

The information processing device 1000 stores, in the storage unit 1006, an operating system (OS), the various categories of programs, a variety of tables, etc.

The OS is software (kernel) acting as an intermediary between the software (application software) and the hardware (hardware components), performing memory space management, file management and process-and-task management. The OS embraces a communication interface. The communication interface is defined as a program for transferring and receiving the data to and from another external device etc connected via the communication unit 1012.

The computer realizing the stereoscopic image generating device 100 is, with a processor loading the program stored in a secondary storage device into the main storage device and thus executing the program, thereby enabled to actualize a function as the control unit 110. On the other hand, the storage unit 120 is provided in a storage area of the main storage device or the secondary storage device. The transmitting/receiving unit 130 can be realized as the CPU 1002 and the communication unit 1012. The display unit 140 can be realized as the output unit 1010.

A series of processes can be executed hardwarewise and can be carried out softwarewise as well.

Steps of describing the program contain, as a matter of course, the processes implemented in time-series along the sequence described therein and the processes that are, though not necessarily processed in time-series, executed in parallel or individually.

(Structures of Display Device and Optical Unit)

Figure 5:
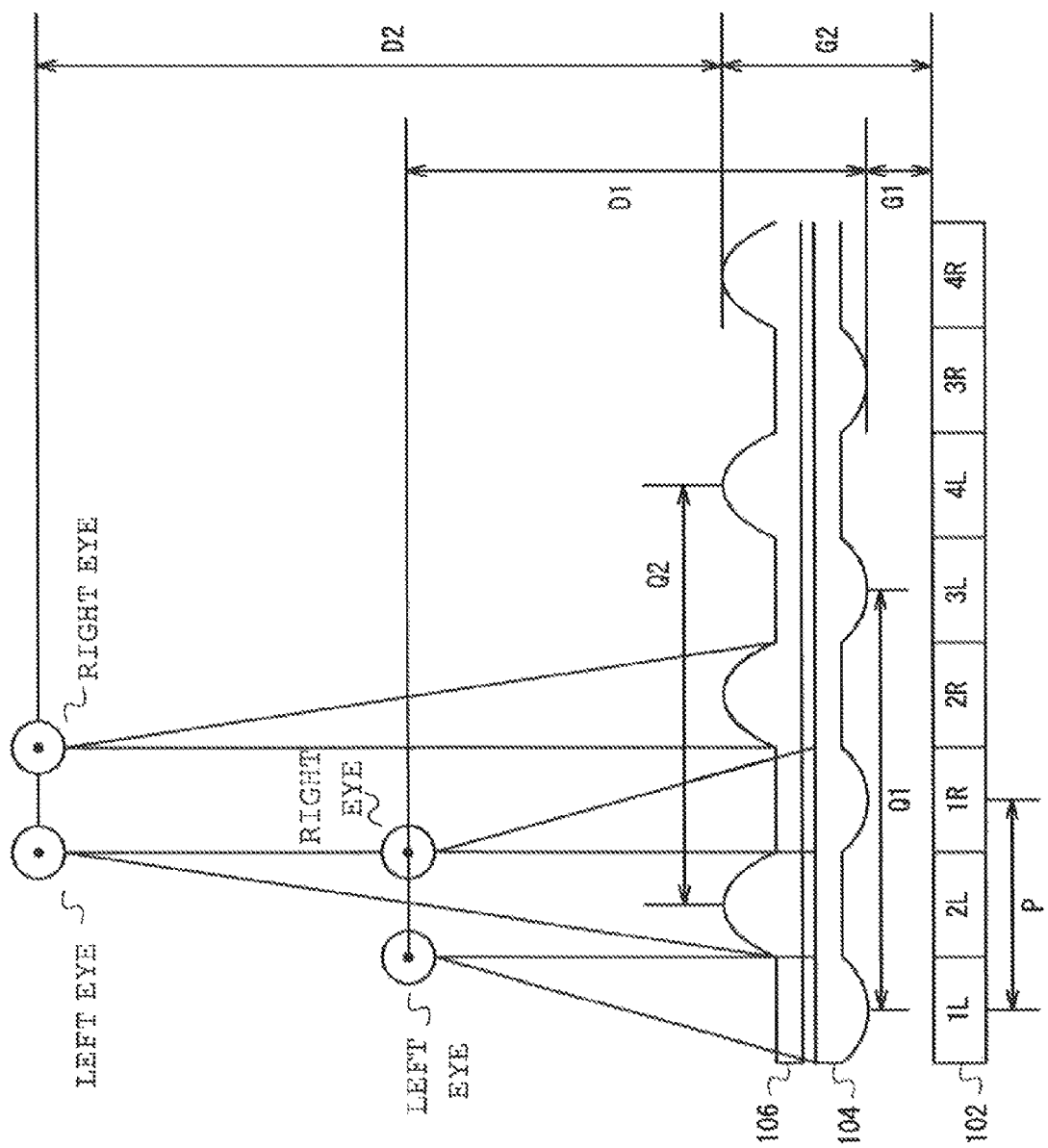
FIG. 5 is a diagram illustrating an example of a section of a stereoscopic image generating device 100.

FIG. 5 is a diagram illustrating an example of a section of the stereoscopic image generating device 100. As in FIG. 5, let G1 be a distance between the display device 102 and a principal point of a first lens of the first optical unit 104, and let G2 be a distance between the display device 102 and a principal point of a second lens of the second optical unit 106. Further, let D1 be a distance between the principal point of the first lens and a position in which an image on the display device 102 is formed via the first lens, and let D2 be a distance between the principal point of the second lens and a position in which the image on the display device 102 is formed via the second lens. Let f1 be a focal length of the first lens, and let f2 be a focal length of the second lens. The focal length of the lens is obtained from a material and a radius of curvature of the lens.

As in FIG. 5, the first lens of the first optical unit 104 and the flat surface portion of the second optical unit 106 are installed so as to be substantially superposed. Light emitted from the display device 102 travels through the first lens of the first optical unit 104 and through the flat surface portion of the second optical unit 106, thus reaching eyes of a user. Similarly, the flat surface portion of the first optical unit and the second lens of the second optical unit are installed so as to be substantially superposed. The light emitted from the display device 102 travels through the flat surface portion of the first optical unit 104 and through the second lens of the second optical unit 106, thus reaching the eyes of the user. The light passing through the first lens of the first optical unit 104 travels through the flat surface portion of the second optical unit 106 and is thereby not affected by the second lens of the second optical unit 106. Moreover, the light passing through the second lens of the second optical unit 106 travels through the flat surface portion of the first optical unit 104 and is thereby not affected by the first lens of the first optical unit 104.

As in FIG. 5, images (pixels) 1L, 3L on the display device 102 get incident on (enter) the left eye of the user (the front-side user) that exists in the position where the image(s) on the display device 102 is formed via the first lens. Further, images (pixels) 1R, 3R on the display device 102 enter the right eye of the user (the front-side user) that exists in the position where the image (s) on the display device 102 is formed via the first lens. Similarly, images 2L, 4L on the display device 102 enter the left eye of the user (the rear-side user) that exists in a position where the image (s) on the display device 102 is formed via the second lens. Further, images 2R, 4R on the display device 102 enter the right eye of the user (the rear-side user) that exists in the position where the image(s) on the display device 102 is formed via the second lens. This is the same with respect to a depthwise direction and right-and-left directions.

A set of pixels (images) 1L and 2L, a set of pixels 1R and 2R, a set of pixels 3L and 4L and a set of pixels 3R and 4R may be each common. Namely, the pixels 1L and the pixels 2L may be common to each other.

Figure 6:
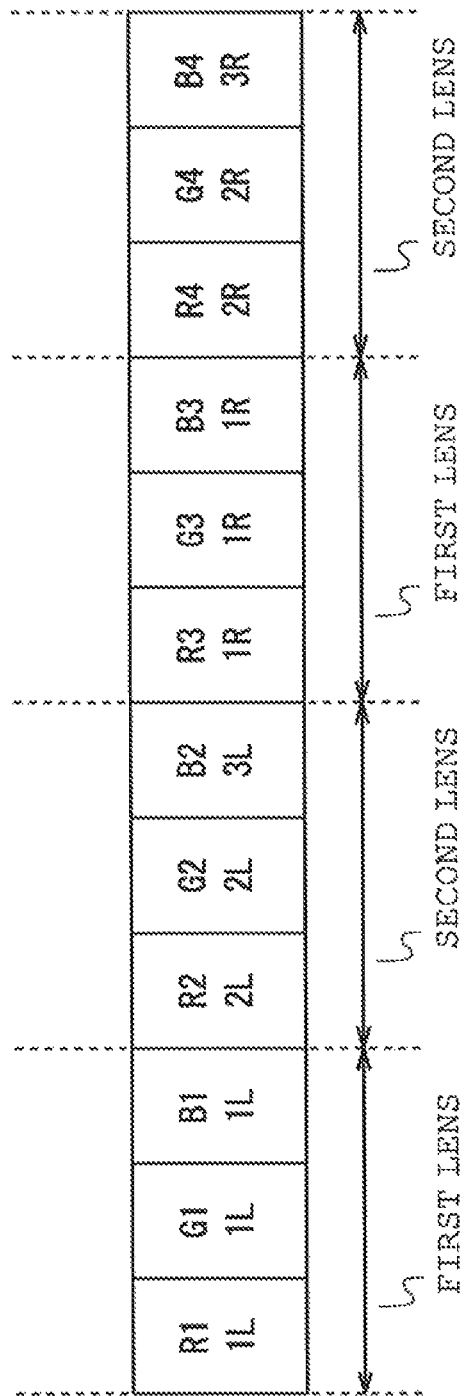
FIG. 6 is a diagram illustrating an example of how first lenses and second lenses are disposed and how pixels are arranged on a screen of the display device.

FIG. 6 is a diagram illustrating an example of how the first and the second lenses are disposed and how the pixels of the picture on the display device are laid out. The pixels depicted in FIG. 6 are some of the pixels of the picture on the display device. The respective pixels (1L, 2L, etc) each contain color elements of R (Red), G (Green) and B (Blue). For example, one pixel is formed of R1, G1, B1 in FIG. 6. The image for the left eye is displayed by use of the pixels 1L, 2L, etc. The pixels 1L, 2L, etc are the pixels for the left eye. Similarly, the image for the right eye is displayed by use of the pixels 1R, 2R, etc. The pixels 1R, 2R, etc are the pixels for the right eye. The light emitted from the pixels 1L, 1R enters the first lens. The light emitted from the pixels 2L, 2R enters the second lens. The respective pixels are formed by display elements of the display screen of the display device. The display elements are arrayed in a horizontal direction (a crosswise direction in FIG. 6) and in a direction (a vertical direction) orthogonal to the horizontal direction on the display screen. The first lens and the second lens are directed in parallel to the direction orthogonal to the horizontal direction. The display screen is configured by the display elements arrayed in the horizontal direction and in the direction orthogonal to the horizontal direction.

According to a formula of the lens, the following expression is established between the distance D1, the distance G1 and the distance (focal length) f1.

$$\frac{1}{D1} + \frac{1}{G1} = \frac{1}{f1}$$ [Mathematical Expression 1]

The same expression is established also between the distance D2, the distance G2 and the distance (focal length) f2. Accordingly, the distance D1 and the distance D2 defined as the user's positions can be determined by adjusting the distance G1, the distance G2, the distance f1 and the distance f2.

A sum of the distances D1 and G1 is set different from a sum of the distances D2 and G2. The distances are thus set, thereby enabling the user to visually recognize the stereoscopic image displayed on the display device 102 from a plurality of positions. The sum of the distances D1 and G1 is a distance between the display screen of the display device 102 and the user who visually recognizes the stereoscopic image via the first lens. The sum of the distances D2 and G2 is a distance between the display screen of the display device 102 and the user who visually recognizes the stereoscopic image via the second lens.

An interval between the respective first lenses of the first optical unit is determined by the following expression. Herein, as in FIG. 5, let Q1 be a distance between the first lens upon which the light emerging from the pixel 1L gets incident and the first lens upon which the light emerging from the pixel 3L gets incident. A distance between the first lens upon which the light emerging from the pixel 1L gets incident and the first lens upon which the light emerging from the pixel 1R gets incident, is a half of the distance Q1. Let Q2 be a distance between the first lens upon which the light emerging from the pixel 2L gets incident and the first lens upon which the light emerging from the pixel 4L gets incident. A distance between the first lens upon which the light emerging from the pixel 2L gets incident and the first lens upon which the light emerging from the pixel 2R gets incident, is a half of the distance Q2.

Further, let P be a distance between the pixel 1L and the pixel 1R on the display device 102. The distance between the pixel 1L and the pixel 2L on the display device 102 is a half of the distance P.

$$2P \times D1 = Q1(D1+G1)$$

$$2P \times D2 = Q2(D2+G2)$$ [Mathematical Expression 2]

Figure 7:
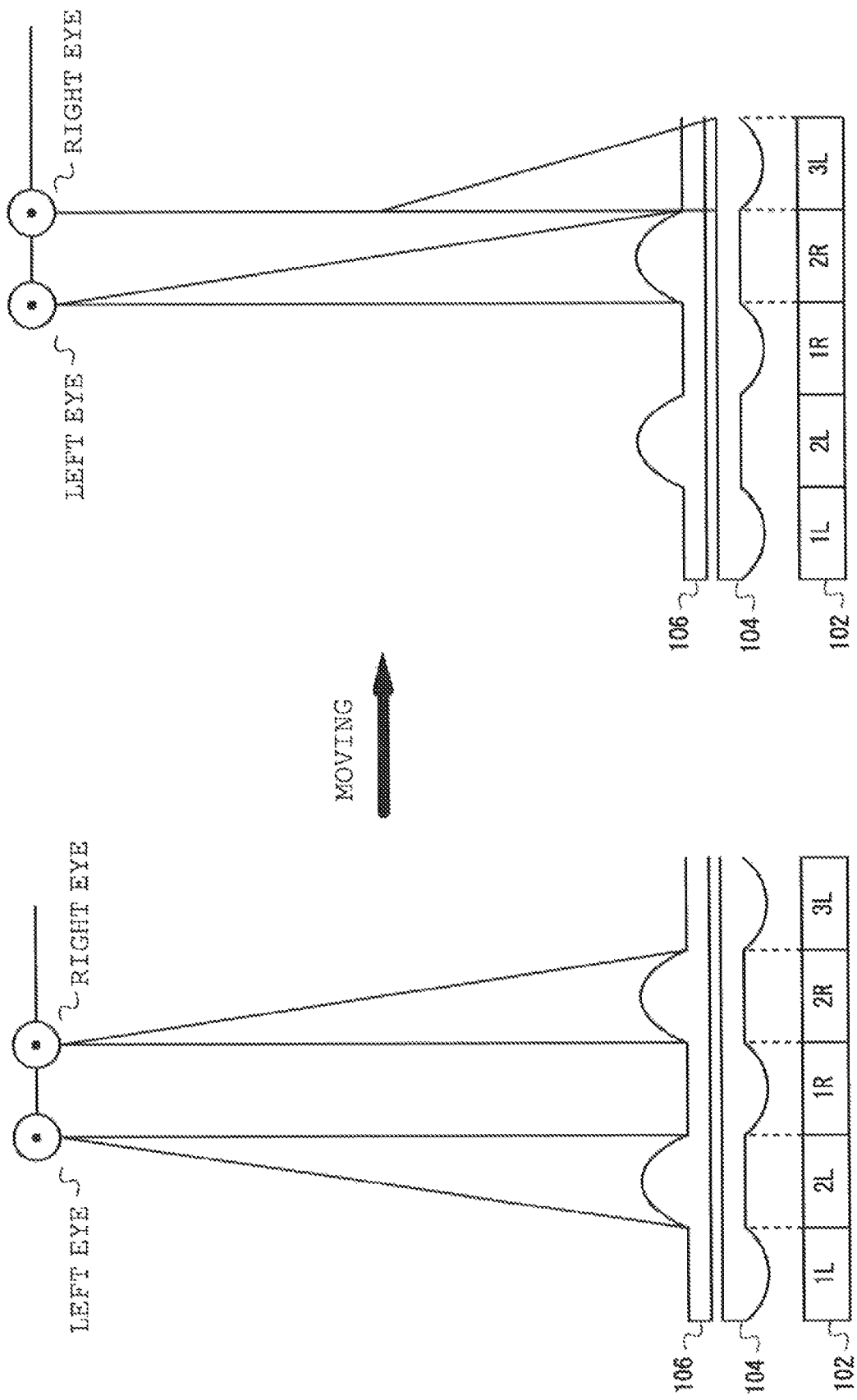
FIG. 7 is a diagram depicting an example when eye points move.

FIG. 7 is a diagram illustrating an example when eye points move. On the right side in FIG. 7, the user exists in positions where the images (of the light beams emerging) from 2L and 2R are formed at the right and left eyes of the user, in which the user looks at the image (from the pixel) 2L with the left eye and the image (from the pixel) 2R with the right eye. The user is thereby enabled to recognize the stereoscopic image by looking at the image for the left eye with the left eye and the image for the right eye with the right eye.

Herein, as on the left side in FIG. 7, an assumption is that the user moves slightly on the right side. At this time, the left eye of the user is located in the position where the image from the pixel 2R, i.e., the image for the right eye is located in the position where the image from 2R is formed. Thereupon, the image for the right eye is visually recognized by the left eye of the user. On the other hand, the right eye of the user is not located in the position where any one of the images (projected) from the display device 102 is formed. For example, the image from 3L is formed in front of the user and is not therefore visible to the right eye of the user. The right eye of the user is capable of seeing only a blurred image. Accordingly, the user can see the stereoscopic image with both of eyes in a way that moves to the left or the right. Hence, this does not mean that the user visually recognizes the stereoscopic image in a pseudoscopic view state. The pseudoscopic view state (opposite to an orthoscopic view state) is a state where the image for the right eye is perceived by the left eye, while the image for the left eye is perceived by the right eye.

(Operational Example of Stereoscopic Image Generating Device)

Figure 8:
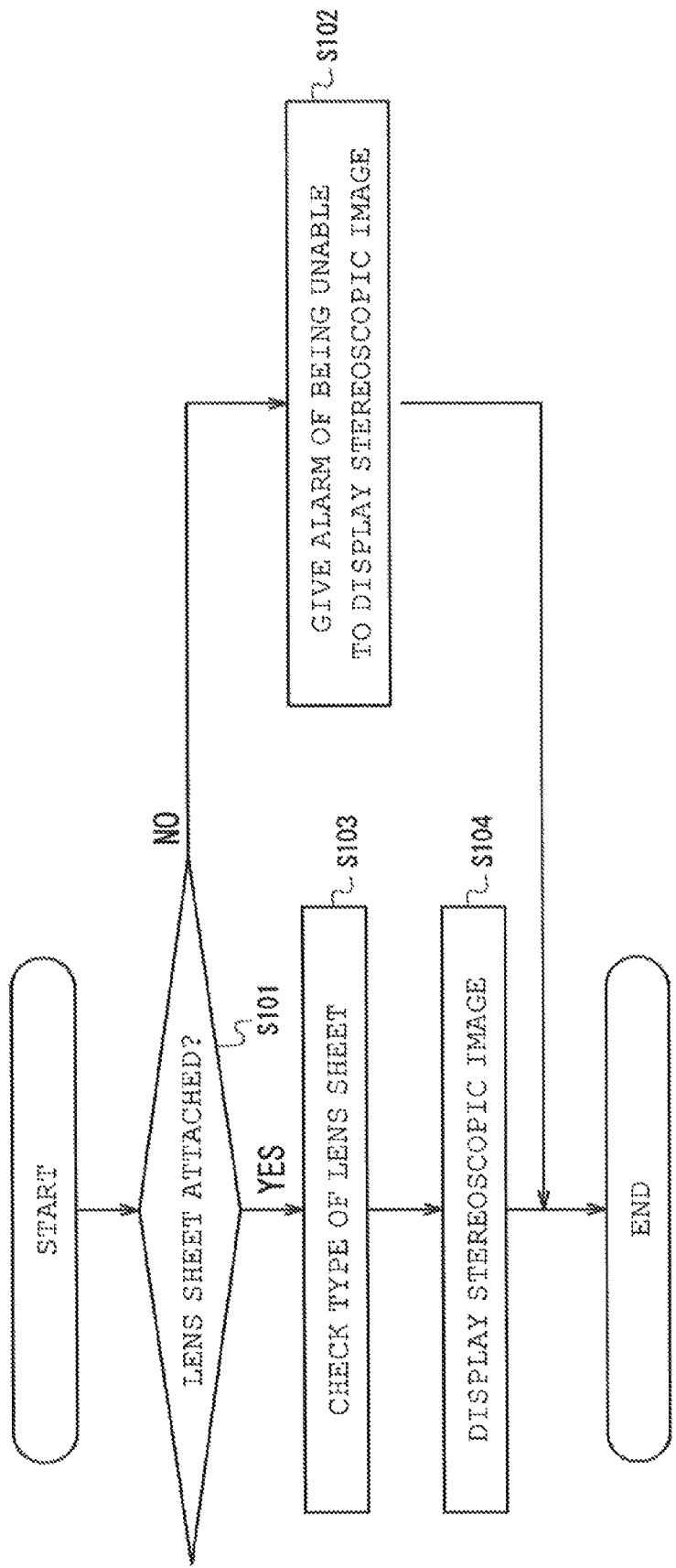
FIG. 8 is a flowchart illustrating an example of an operation flow of the stereoscopic image generating device.

FIG. 8 is a flowchart illustrating an example of an operation flow of the stereoscopic image generating device. A start of the operation flow in FIG. 8 is triggered by starting up, e.g., a stereoscopic image reproducing program. The stereoscopic image reproducing program is stored in the storage unit 120. The stereoscopic image reproducing program displays the stereoscopic image on the display device 102.

The stereoscopic image generating device 100 checks whether or not the first optical unit 104 and the second optical unit 106 are fitted to the display device 102 (S101). The first optical unit 104 and the second optical unit 106 are referred to also as a lens sheet (lenticular sheet). The stereoscopic image generating device 100 can check, by use of, e.g., a switch etc mounted on the display device 102, whether or not the lens sheet is attached to the display device 102. The switch is mounted at, e.g., a hook for fixing the lens sheet on the display device 102. The stereoscopic image generating device 100 detects an electrical signal of the switch mounted at the hook and is thereby enabled to recognize that the lens sheet is attached.

Figure 9:
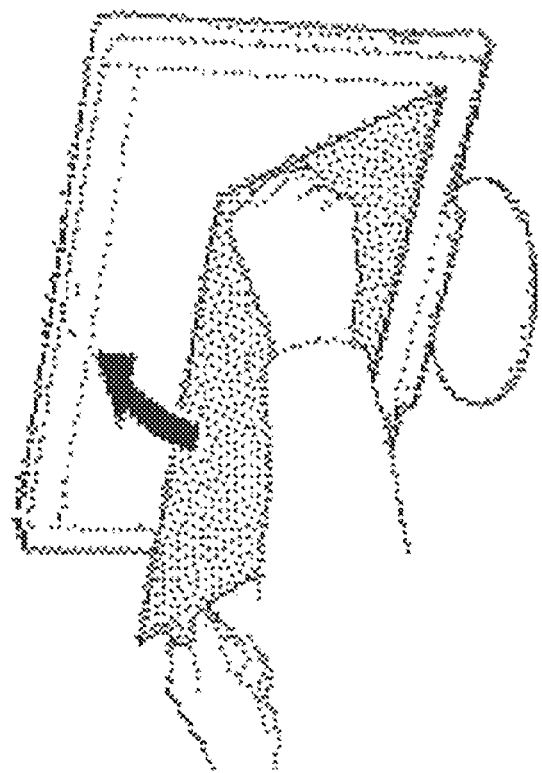
FIG. 9 is a view depicting an example of how a lens sheet is attached to the display device.

FIG. 9 is a view depicting an example of how the lens sheet is attached to the display device. The lens sheet is attached to the screen of the display device 102 in away that fixes its position.

If the lens sheet is not attached to the display device 102 (S101; NO), the stereoscopic image generating device 100 displays a purport saying that the stereoscopic image cannot be displayed on the display device 102 (S102). The stereoscopic image generating device 100, even when the lens sheet is not normally attached, determines that the lens sheet is not attached. Thereafter, the stereoscopic image generating device 100 finishes the stereoscopic image reproducing program.

Figure 10:
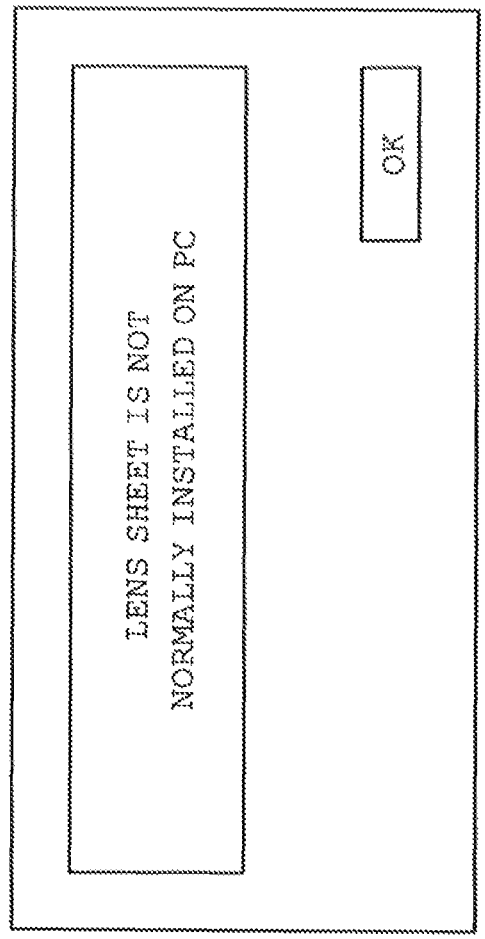
FIG. 10 illustrates an example of displaying a purport (message) saying that the stereoscopic image cannot be displayed on a display device 102.

FIG. 10 illustrates an example of displaying a purport saying that the stereoscopic image cannot be displayed on the display device 102. The stereoscopic image generating device 100, when determining that the lens sheet is not attached, displays a purport (message) as in FIG. 10 on the display device 102.

When the lens sheet is attached to the display device 102 (S101; YES), the stereoscopic image generating device 100 checks a type of the lens sheet attached to the display device 102 (S103). This is because of a change in position where the image (projected) from the display device 102 is formed due to the focal length etc of the lens sheet. The stereoscopic image generating device 100 can display, e.g., a position optimal to the visual recognition corresponding to the type of the lens sheet on the display device 102. Further, the stereoscopic image generating device 100 can display the stereoscopic image by setting a pixel array corresponding to the type of the lens sheet.

The stereoscopic image generating device 100 displays the stereoscopic image on the display device 102 (S104). The stereoscopic image generating device 100 displays the image for the left eye in the pixels for the left eye and the image for the right eye in the pixels for the right eye. The stereoscopic image generating device 100, upon an end of displaying the stereoscopic image, finishes the stereoscopic image reproducing program.

Effects in Embodiment

The stereoscopic image generating device 100 includes the two optical units having the plurality of lenticular lenses. The stereoscopic image generating device 100 forms, with the two optical units being stacked, the image displayed on the display device 102 as images at two distances from the display device 102. The user of the display device 102 can visually recognize the stereoscopic image displayed on the display device 102 from the plurality of positions.

The stereoscopic image generating device 100 covers a front image forming point and a rear image forming point with respect to the display device 102 and is thereby enabled to prevent the occurrence of the pseudoscopic view state even when the user visually recognizing the stereoscopic image at any one of the image forming points moves right and left.

The stereoscopic image generating device 100 includes the first optical unit having the first lens on the internal side (on the side of the display device) and the second optical unit having the second lens on the external side (on the side opposite to the side of the display device), whereby the distances (the distances G1 and G2) between the respective lenses and the display device 102 can be largely differentiated. With this contrivance, the stereoscopic image generating device 100 can largely differentiate the image forming positions (the image forming points; the sum of the distances G1 and D1 and the sum of the distances G2 and D2) via the respective lenses.

Modified Examples

Modified examples of the embodiment described above will be described. The modified examples have points common to the embodiment described above. Therefore, the discussion will be focused on different points, while the description of the common points is omitted.

Figure 11:
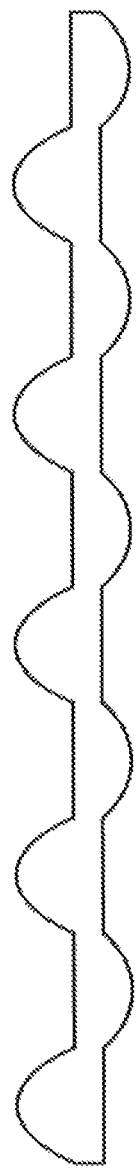
FIG. 11 is a diagram illustrating a modified example of a first optical unit and a second optical unit.

FIG. 11 is a diagram illustrating a modified example of the first optical unit and the second optical unit. In the embodiment described above, the first optical unit 104 and the second optical unit 106 are separated from each other, however, the example in FIG. 11 is that the first optical unit 104 and the second optical unit 106 are joined to configure one united optical unit. The optical unit is thus configured, thereby enabling the number of components to be reduced.

Figure 12:
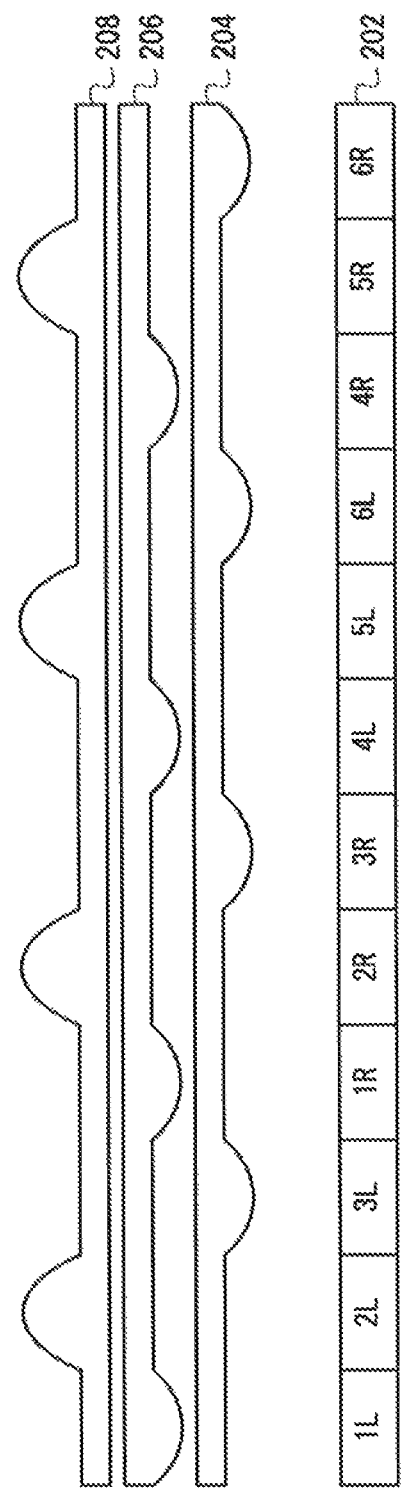
FIG. 12 is a diagram illustrating a modified example of the optical units and the display device.

FIG. 12 is a diagram illustrating a modified example of the optical unit and the display device. The example in FIG. 12 is that the stereoscopic image generating device includes a display device 202, a first optical unit 204, a second optical unit 206 and a third optical unit 208. The stereoscopic image generating device in FIG. 12 includes the three optical units.

The first optical unit 204, the second optical unit 206 and the third optical unit 208 have the same configurations as those of the first optical unit 104 and the second optical unit 106. Each of the optical units in the present modified example has a flat surface portion so that the self-lens does not admit the light passing through the lenses of other optical units. Accordingly, each of the optical units in the modified example has the flat surface portion larger than the flat surface portion of the optical unit in the embodiment discussed above. The surface on which the lens of each of the optical units exists may be provided on the side of the display device and may also be provided on the opposite side.

Herein, the case of including the three optical units is exemplified, however, a configuration of including the three or more optical units is also available. The device based on this configuration takes a configuration of including the plurality of optical units, thereby enabling the image (projected) from the display screen to be formed at the plurality of distances from the display screen.

Figure 13:
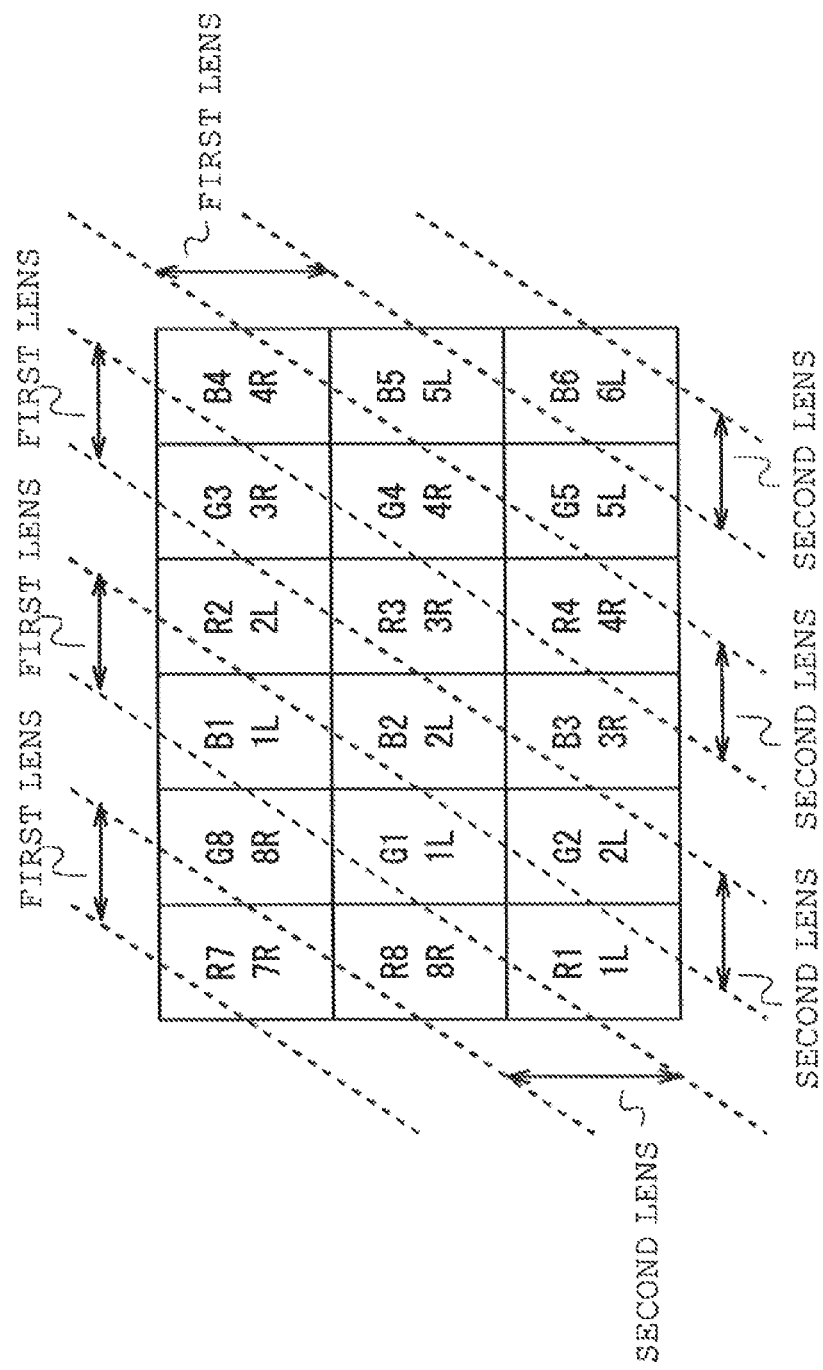
FIG. 13 is a diagram illustrating an example of disposing first lenses and second lenses in a direction oblique to the display device.

FIG. 13 is a diagram illustrating an example of disposing the first lenses and the second lenses in a direction oblique to the pixel array on the display device. On the screen of the display device 102, the elements (display elements) of the color elements are arrayed in the horizontal direction (the crosswise direction in FIG. 13) and in the direction (the vertical direction in FIG. 13) orthogonal to the horizontal direction on the display surface. In the embodiment, as in FIGS. 2 and 6, the first and second lenses are disposed in parallel to the array direction (the vertical direction in FIG. 6) of the image elements on the display device 102. By contrast, the example in FIG. 13 is that the first and second lenses are disposed in the direction (the non-parallel direction) oblique to the vertical direction of the array of the image elements of the display device. The first and second lenses are disposed mutually in parallel to the directions of the other (first or second) lenses. Along with this arrangement, in the respective pixels displayed on the display device 102, the color elements are arranged in the oblique direction. For example, the color elements R1, G1, B1 form one pixel. Similarly, this is the same with other color elements. The directions of the color elements in the respective pixels are parallel to the directions of the individual lenses. In the example in FIG. 6, one pixel is formed by arranging the color elements R, G, B in the crosswise direction, however, the example in FIG. 13 is that one pixel is formed by arranging the color elements in the oblique direction. The majority of light beams emerging from the pixels 1L, 1R enter the first lenses, while the majority of light beams emerging from the pixels 2L, 2R enter the second lenses.

In the example in FIG. 6, the pixels in the crosswise direction are reduced down to a quarter of the pixels of the two dimensional image. In the example in FIG. 13, the pixels in the crosswise direction are reduced down to only just three quarters of the pixels of the two dimensional image. By contrast, in the example in FIG. 13, the pixels in the vertical direction are reduced down to one third of the pixels of the two dimensional image.

The lenses are arranged in the oblique direction, and the single pixel is disposed in the oblique direction, whereby a resolution is prevented from decreasing only in the crosswise direction. Deterioration in image quality looks smaller when the resolution decreases in the vertical direction and in the crosswise direction than when decreasing only in the crosswise direction.

The lens sheet disposed in the oblique direction as in FIG. 13 is attached to the display device, in which case the stereoscopic image generating device gives an instruction of arranging the color elements of the respective pixels as in FIG. 13. For instance, the stereoscopic image generating device 100 recognizes that the lens sheet disposed in the oblique direction is attached in step S103 in FIG. 8, and instructs arranging the color elements of the respective pixels as in FIG. 13 in step S104.

Further, in the examples given above (in FIGS. 6, 13, etc), the pixels for displaying the image for the left eye and the pixels for displaying the image the right eye on the screen of the display device 102, are arranged respectively on a plurality of straight lines parallel to each other. The arrangement of the pixels is not, however, limited to the arrangement on the straight lines. For example, the pixels for displaying the image for the left eye and the pixels for displaying the image the right eye may be arranged on a plurality of lines each taking a serrated shape. At this time, the first lens and the second lens take the serrated shapes corresponding to the arrangement of the respective pixels. Namely, there is no limit to the arrangements of the pixels for displaying the image for the left eye and the pixels for displaying the image the right eye. The first lens and the second lens may take shapes corresponding to the arrangements of the pixels for displaying the image for the left eye and the pixels for displaying the image the right eye.

Further, the stereoscopic image generating device 100 can determine which display element is used for displaying the image for the left eye or the image for the right eye on the screen of the display device 102 in a way that corresponds to the shapes of the first lens and the second lens, which are installed on the display device 102.

Figure 14:
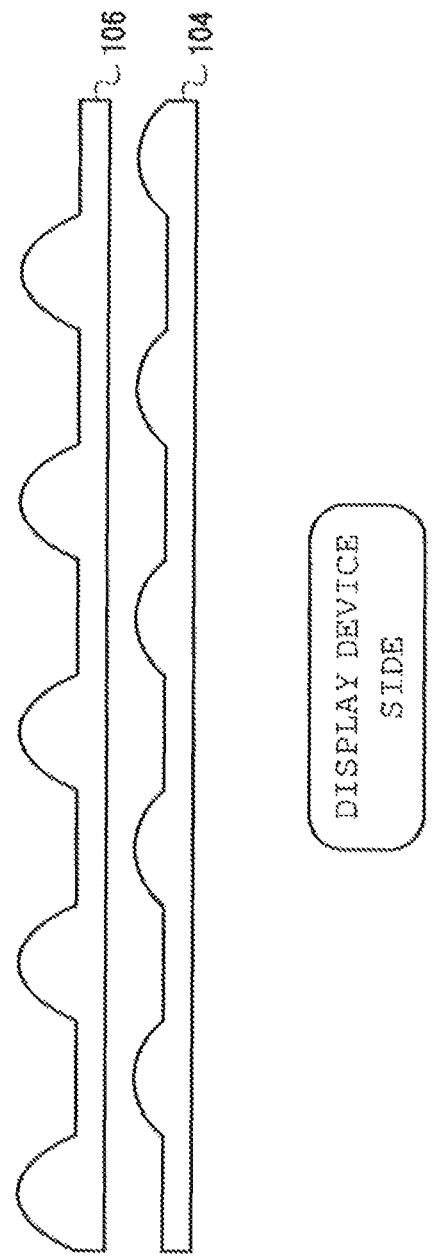
FIG. 14 is a diagram illustrating a modified example (1) of the first optical unit and the second optical unit.
Figure 15:
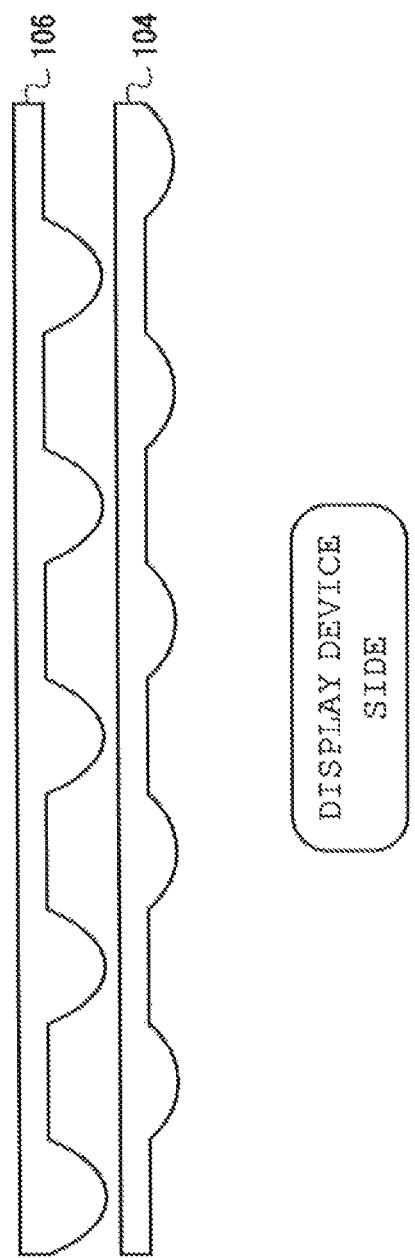
FIG. 15 is a diagram illustrating a modified example (2) of the first optical unit and the second optical unit.
Figure 16:
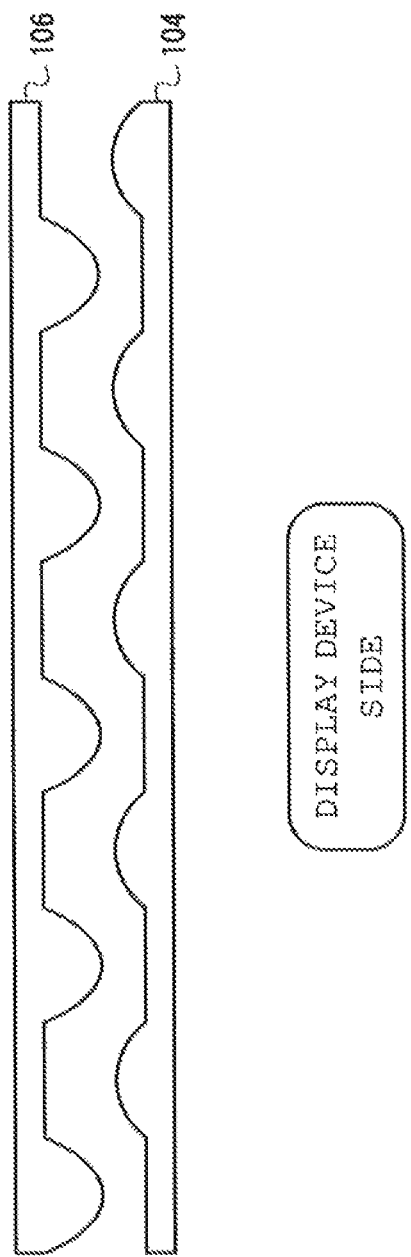
FIG. 16 is a diagram illustrating a modified example (3) of the first optical unit and the second optical unit.

FIGS. 14, 15 and 16 are diagrams illustrating modified examples of the first optical unit and the second optical unit. In the embodiment discussed above, the first lens surface of the first optical unit 104 is directed to the display device, while the second lens surface of the second optical unit 106 is directed to the outside (the side opposite to the side of the display device).

The surfaces on which the lenses of the first optical unit and the second optical unit exist are not limited to the example in the embodiment but may take configurations as in FIGS. 14 through 16. The surface on which the lens of the first optical unit or the second optical unit exists may be set on the side of the display device and may also set on the external side (the side opposite to the side of the display device). Even in such a case that the first optical unit and the second optical unit are disposed as in FIGS. 14 through 16, the image displayed on the display device 102 can be formed at the two distances from the display device 102. Hence, even in the case of disposing the first optical unit and the second optical unit are disposed as in FIGS. 14 through 16, the stereoscopic image can be visually recognized from the plurality of positions for the visual recognition.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A stereoscopic image display device comprising:
a display device to include a display surface;
a first optical unit to be installed in parallel to the display surface adjacently to the display surface of the display device, one surface including a first convex portion via which to form an image of light emerging from the display surface at a first image forming point and a first flat surface portion, and the other surface being a flat surface; and
a second optical unit to be installed in parallel to the first optical unit adjacently to the first optical unit, one surface including a second convex portion via which to form the image of light emerging from the display surface at a second image forming point different from the first image forming point and a second flat surface portion, and the other surface being a flat surface,
wherein the light, emerging from the display surface, of which an image is formed at the first image forming point via the first convex portion, travels through the second flat surface portion,
an image of the light, emerging from the display surface and travelling through the first flat surface portion and the second convex portion, is formed at the second image forming point, and
the first image forming point and the second image forming point are set at different distances from the display surface.

2. A stereoscopic image display device comprising:
a display device to include a display surface;
a first optical unit to be installed in parallel to the display surface adjacently to the display surface of the display device, one surface including a first convex portion via which to form an image of light emerging from the display surface at a first image forming point and a first flat surface portion, and the other surface being a flat surface; and
a second optical unit to be installed in parallel to the first optical unit adjacently to the first optical unit, one surface including a second convex portion via which to form the image of light emerging from the display surface at a second image forming point different from the first image forming point and a second flat surface portion, and the other surface being a flat surface,
wherein the light, emerging from the display surface, of which an image is formed at the first image forming point via the first convex portion, travels through the second flat surface portion,
an image of the light, emerging from the display surface and travelling through the first flat surface portion and the second convex portion, is formed at the second image forming point,
the first image forming point and the second image forming point are set at different distances from the display surface, the flat surface of the first optical unit is provided on the side of the second optical unit and the first convex portion of the first optical unit projects toward the display surface, and the flat surface of the second optical unit is provided on the side of the first optical unit and the second convex portion of the second optical unit projects toward the opposite side of the display surface.

3. A stereoscopic image display device comprising:

a display device to include a display surface;

a first optical unit to be installed in parallel to the display surface adjacently to the display surface of the display device, one surface including a first convex portion via which to form an image of light emerging from the display surface at a first image forming point and a first flat surface portion, and the other surface being a flat surface; and a second optical unit to be installed in parallel to the first optical unit adjacently to the first optical unit, one surface including a second convex portion via which to form the image of light emerging from the display surface at a second image forming point different from the first image forming point and a second flat surface portion, and the other surface being a flat surface, wherein the light, emerging from the display surface, of which an image is formed at the first image forming point via the first convex portion, travels through the second flat surface portion, an image of the light, emerging from the display surface and travelling through the first flat surface portion and the second convex portion, is formed at the second image forming point, the first image forming point and the second image forming point are set at different distances from the display surface, the first convex portion of the first optical unit is non-parallel to an array direction of display elements on the display surface of the display device, and the convex portion of the second optical unit is parallel to the first convex portion of the first optical unit.

* * * * *